(12) United States Patent
Geller et al.

(10) Patent No.: US 10,368,227 B2
(45) Date of Patent: *Jul. 30, 2019

(54) ACCESS POINT MANAGEMENT AND USAGE IN A NETWORK ENVIRONMENT

(71) Applicant: Time Warner Cable Enterprises LLC, New York, NY (US)

(72) Inventors: Steven I. Geller, Kensington, MD (US); Peter Stern, Los Altos, CA (US); Robert A. Cerbone, Potomac, MD (US); Michael C. Roudi, Plano, TX (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,458

(22) Filed: Apr. 25, 2017

(65) Prior Publication Data

US 2017/0230813 A1 Aug. 10, 2017

Related U.S. Application Data

(63) Continuation of application No. 14/167,082, filed on Jan. 29, 2014, now Pat. No. 9,648,506.

(51) Int. Cl.
*H04W 24/02* (2009.01)
*H04W 16/18* (2009.01)
(Continued)

(52) U.S. Cl.
CPC ............ *H04W 8/005* (2013.01); *H04L 43/16* (2013.01); *H04L 67/303* (2013.01);
(Continued)

(58) Field of Classification Search
CPC ..... H04W 24/02; H04W 16/10; H04W 16/18; H04W 64/003; H04W 16/20; H04W 16/24; H04W 16/30; H04W 16/32
USPC ...... 455/446–449, 456.1–457; 715/762–764, 715/765, 767, 769, 771–773, 775, 715/780–783
See application file for complete search history.

(56) References Cited

U.S. PATENT DOCUMENTS 8,929,931 B1 1/2015 Goldberg
9,008,670 B2 4/2015 Goldberg
(Continued)

*Primary Examiner* — Allahyar Kasraian
(74) *Attorney, Agent, or Firm* — Armis IP Law, LLC

(57) ABSTRACT

A network management application receives input from a subscriber operating a computer device to add a new wireless access point to a network environment. The input specifies a geographical location in which the subscriber requests installation of the new wireless access point in the network environment. The network management application produces a message to include the geographical location as specified by the input. The message indicates that the subscriber requests installation of the new wireless access point at the geographical location. The network management application initiates transmission of the message from the computer device to an aggregator resource at a remote location. A service provider analyzes installation request information produced by the aggregator resource to determine where to install one or more new wireless access points in the network environment.

14 Claims, 10 Drawing Sheets

(51) Int. Cl.
*H04W 8/00* (2009.01)
*H04L 12/26* (2006.01)
*H04L 29/08* (2006.01)
*H04W 4/02* (2018.01)
*H04W 64/00* (2009.01)
*H04W 84/12* (2009.01)
*H04W 88/08* (2009.01)
*H04W 88/12* (2009.01)

(52) U.S. Cl.
CPC ........... *H04W 4/023* (2013.01); *H04W 24/02* (2013.01); *H04W 64/003* (2013.01); *H04W 16/18* (2013.01); *H04W 84/12* (2013.01); *H04W 88/08* (2013.01); *H04W 88/12* (2013.01)

(56) References Cited

U.S. PATENT DOCUMENTS

| | | |
|---|---|---|
| 2003/0093314 A1 | 5/2003 | Leung |
| 2006/0038719 A1* | 2/2006 | Pande ................... G01S 5/0027 342/357.64 |
| 2007/0159990 A1 | 7/2007 | Wu |
| 2011/0018732 A1 | 1/2011 | Cho |
| 2011/0244892 A1 | 10/2011 | MacManus |
| 2013/0065599 A1* | 3/2013 | Chan ..................... H04W 16/18 455/446 |
| 2014/0221012 A1* | 8/2014 | Uetabira ............... H04W 4/029 455/456.3 |
| 2015/0198938 A1 | 7/2015 | Steele |
| 2015/0212697 A1 | 7/2015 | Nordstrom |

* cited by examiner

ACCESS POINT MANAGEMENT AND USAGE IN A NETWORK ENVIRONMENT

RELATED APPLICATIONS

This application is a continuation of earlier filed U.S. patent application Ser. No. 14/167,082 entitled "ACCESS POINT MANAGEMENT AND USAGE IN A NETWORK ENVIRONMENT," filed on Jan. 29, 2014, the entire teachings of which are incorporated herein by this reference.

BACKGROUND

Conventional RF (Radio Frequency) technology has been used for many years to connect wireless devices such as phones, laptops, etc., to a landline network and/or other wireless networks. Today, RF technology supports many different types of connection services such as voice communications, high-speed data services, WiFi™ connectivity, and so on.

One type of mature RF technology is cellular network technology. Conventional cellular network technology typically includes an expansive land area that has been divided into so-called cellular regions. A single cellular base station typically resides in each cell. The single cellular base station typically provides coverage over multiple square miles of land. Often, a base station in a respective cell is connected to a landline network. Via wireless communications between the respective cell phone and base station, the wireless subscriber operating a cell phone in the cellular region is able to communicate with or have access to the landline network.

Another type of RF technology is known as Wi-Fi™. This more recently implemented wireless technology includes large-scale installation of WiFi™ base stations. In comparison to the conventional long-range cellular network technology as previously discussed, WiFi™ technology supports short-range communications such as 200-300 meters as opposed to 1500 or more meters provided by cellular telephone base stations. In comparison to installation of cellular telephone towers, installation of WiFi™ base stations is substantially less expensive.

The wireless coverage in a vicinity of a respective WiFi™ base station is sometimes called a WiFi™ hot spot. As mentioned, wireless coverage provided by a WiFi™ base station is typically much smaller than wireless coverage provided by a corresponding long-range base station disposed on a cellular telephone tower.

When located within the WiFi™ hotspot, a mobile device operated by a corresponding user is able to establish a wireless communication link between the mobile device and the WiFi™ base station. Via communications over the wireless communication link, the mobile device has access to hardwired networks and is able to perform operations such as retrieve data from and transmit data to other resources in a network environment.

BRIEF DESCRIPTION OF EMBODIMENTS

Conventional techniques of installing short-range RF communication technology such as WiFi™ technology can suffer from deficiencies. For example, a service provider implementing the short-range RF communication technology must determine where to install one or more short-range base stations. This task may be very difficult because little, if any, data may be available indicating the best locations to install the short-range base stations.

As a specific example, the service provider may be able to identify areas where high numbers of people such as subscribers are likely to frequent. However, mere occurrence of high traffic (such as presence of a large number of people) in a particular area does not mean that users in the area will use a corresponding short-range base station to access a core network such as the Internet. Even though an area experiences high-traffic, users may not connect to the corresponding short-range base station because they are preoccupied with another activity. Thus, mere use of people density information (such as the amount of people per unit area) indicating high numbers of persons in a small area is not necessarily a best indicator of whether installation of a wireless access point would be beneficial.

Embodiments herein deviate with respect to conventional techniques. For example, one embodiment herein is directed to identifying locations in which to install one or more new wireless access points based on user feedback.

More specifically, in accordance with one embodiment, a mobile computer device operated by a respective user includes and executes an application enabling the respective user to identify locations in which to install a corresponding access point. Via input and control of the application, the network management application executing on the mobile computer device receives a request from a user operating the computer device to add a new wireless access point in a network environment. The request can indicate a specific geographical location in which the user requests installation of the new wireless access point in the network environment. In one embodiment, the application produces a message including the geographical location as specified by the user. The message indicates that the user requests installation of the new wireless access point at a specified geographical location. Subsequent to generating the message, the application on the mobile computer device then transmits the message to a remote aggregator resource.

In a similar manner, each of multiple users can identify specific locations and produce installation request messages indicating where to install one or more new access points in the network environment. In such an instance, the remote aggregator resource as described herein can be configured to receive requests from multiple computer users in a network environment.

As previously discussed, each of the requests can specify a corresponding geographical location in which a respective computer user desires installation of a respective new wireless access point in the network environment. In one non-limiting example embodiment, the remote installation management resource compiles the received requests and produces installation request information indicating corresponding geographical locations as specified by the requests. The service provider utilizes the geographical information to identify locations in which to pursue installation of new wireless access points in the geographical region.

Accordingly, in contrast to conventional RF technology, embodiments herein include receiving feedback from one or more computer users such as subscribers. The feedback indicates potential locations in which to install one or more new wireless access points. If the overall feedback from multiple users indicates that a sufficiently high number of users will benefit from installation of an access point at a particular geographical location, a corresponding service provider initiates installation of a new access point at the particular geographical location. Thus, a service provider can determine where to install one or more new access points based at least in part on input from corresponding subscribers that plan to use them sometime in the future.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware (such as in a mobile computer device) to: receive a request from a user operating a computer device to add a new wireless access point to a network environment, the request specifying a geographical location in which the user requests installation of the new wireless access point in the network environment; produce a message to include the geographical location, the message indicating that the user requested installation of the new wireless access point at the geographical location; and transmit the message from the computer device to a remote installation management resource.

One or more embodiments herein include a computer readable storage medium and/or system having instructions stored thereon. The instructions, when executed by computer processor hardware, cause the computer processor hardware (such as in a security system) to: receive requests from multiple computer users in a network environment, each of the requests specifying a corresponding geographical location in which a respective computer user desires installation of a respective new wireless access point in the network environment; produce installation request information indicating corresponding geographical locations as specified by the requests; and utilize the geographical information to identify locations in which to install new wireless access points in the geographical region.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating installation of corresponding wireless access points in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
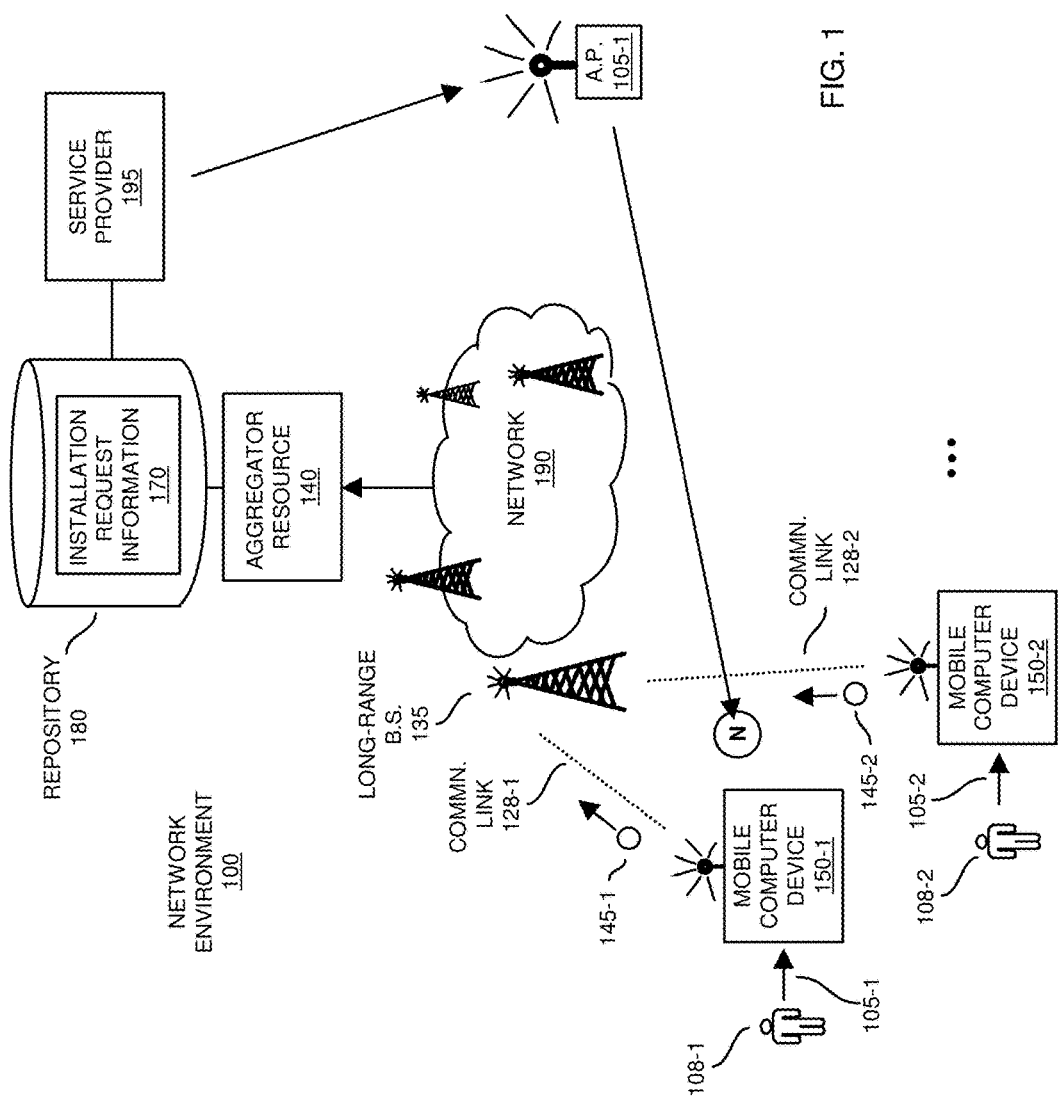
FIG. 1 is an example diagram illustrating a network environment and the system facilitating installation of a new wireless access point based on feedback from multiple users according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating a network environment according to embodiments herein.

As shown, network environment 100 includes multiple computer devices 150 (e.g., computer device 150-1, computer device 150-2, etc.). In one embodiment, a respective user operates each of the multiple computer devices 150. For example, user 108-1 operates mobile computer device 150-1; user 108—to operates mobile computer device 150-2; and so on. Network environment 100 can include any number of mobile computer devices.

Each of the mobile computer devices 150 can be any suitable type of device. For example, mobile computer device 150-1 can be a cell phone, mobile communication device, phone device, digital assistant, a laptop computer, a personal computer, a notebook computer, a netbook computer, a handheld computer, a workstation, etc.

In this example embodiment, via input 105-1, user 108-1 controls respective applications executing on mobile computer device 150-1; via input 105-2, user 108-2 controls respective applications executing on mobile computer device 150-2; and so on.

In accordance with one embodiment, the users 108 operate respective mobile computer devices 150 to request installation of a respective wireless access point in network environment 100. For example, in one non-limiting example embodiment, the mobile computer device 150-1 receives input 105-1 such as a command from user 108-1 (a first subscriber) to generate an installation request message 145-1 indicating that the user would like a new WiFi™ access point installed in the network environment 100.

The input 105-1 received from the user 108 can specify a geographical location in which the user 108-1 requests installation of a new wireless access point in the network environment. The specified geographical location may be a location in which there currently is not a wireless WiFi™ access point available for use by the corresponding user 108-1.

In response to receiving input 105-1, the mobile computer device 150-1 produces the installation request message 145-1 to include the geographical location as specified by the user 108-1 (or geographical location specified by another resource).

Subsequent to creating the installation request message 145-1, the mobile computer device 150-1 then initiates transmission of the installation request message 145-1 from the mobile computer device 150-1 to aggregator resource 140 at a remote location over network 190. Accordingly, the aggregator resource 140 is made aware that the user 108-1 of mobile computer device 150-1 would like a new wireless access point installed at the location specified in the installation request message.

In one embodiment, via generation and forwarding of the installation request message 145-1, the user 108-1 requests installation of a new short-range base station such as a WiFi™ access point at a specified location.

Note that any of one or more suitable types of communication links can be used to communicate installation request messages 145 from mobile computer devices 150 to aggregator resource 140.

For example, in one embodiment, when generating and forwarding installation request messages 145, because a respective short-range base station such as a WiFi™ access point may not be available for use in a particular geographical region, the mobile computer devices 150 may communicate installation request messages using a cellular phone protocol.

As a more specific example, as shown in FIG. 1, assume that the mobile computer device 150-1 transmits the installation request message 145-1 over communication link 128-1 to long-range base station 135 such as a cell phone tower (or other suitable base station in network 190). Long-range base station 135 then forwards the corresponding installation request message through network 190 to aggregator resource 140.

Note that in a similar manner that user 108-1 operates mobile computer device 150-1 to generate installation request message 145-1 as discussed above, user 108-2 can operate mobile computer device 150-2 to generate installation request message 145-2.

More specifically, via input 105-2, the user 108-2 is able to request installation of a corresponding wireless access point at a particular geographical location in network environment 100. In a manner as previously discussed, the mobile computer device 150-2 can be configured to communicate a corresponding installation request message 145-2 over communication link 128-2 to long-range base station 135 such as a cell phone tower (or other suitable base station in network 190). Long-range base station 135 forwards the installation request message 145-2 to aggregator resource 140.

Thus, the aggregator resource 140 receives the installation requests from multiple computer users 108 in network environment 100. Each of the requests specifies a corresponding geographical location in which a respective computer user desires installation of a respective new wireless access point in the network environment 100.

As further shown in FIG. 1, the aggregator resource 140 processes the received installation request messages 145 from multiple subscribers to produce installation request information 170. The installation request information 170 can include information such as corresponding geographical locations to install new wireless access points, identities of the subscribers requesting the new access points, etc. The aggregator resource 140 initiates storage of the installation request information 170 in repository 180.

Service provider 195 has access to installation request information 170. In one embodiment, the service provider 195 analyzes the installation request information 170 to identify locations in which to potentially install one or more new wireless access points. In other words, the service provider 195 can initiate installation of one or more new wireless access points based at least in part on the installation request information 170.

In this example embodiment, assume that a sufficiently large number of subscribers (users 108 that subscribe to services provided by the service provider 195) request installation of a corresponding new wireless access point at a specified location or region in network environment 100. In response to receiving the installation requests, to accommodate users 108, the service provider 195 initiates installation of the new access point 105-1 at the location marked by symbol N (representing a new wireless access point).

Accordingly, in accordance with input from multiple subscribers (users 108), the service provider 195 can be configured to install one or more new wireless access points in network environment 100. In contrast to conventional techniques in which a service provider guesses as to best locations to install new wireless access points, embodiments herein include installing wireless access points based at least in part on requests from users. The requests can specify locations in which to install new access points. Because installation locations are specified by users, the newly installed wireless access points are more likely to be placed in useful locations for subsequent use by corresponding subscribers.

Figure 2:
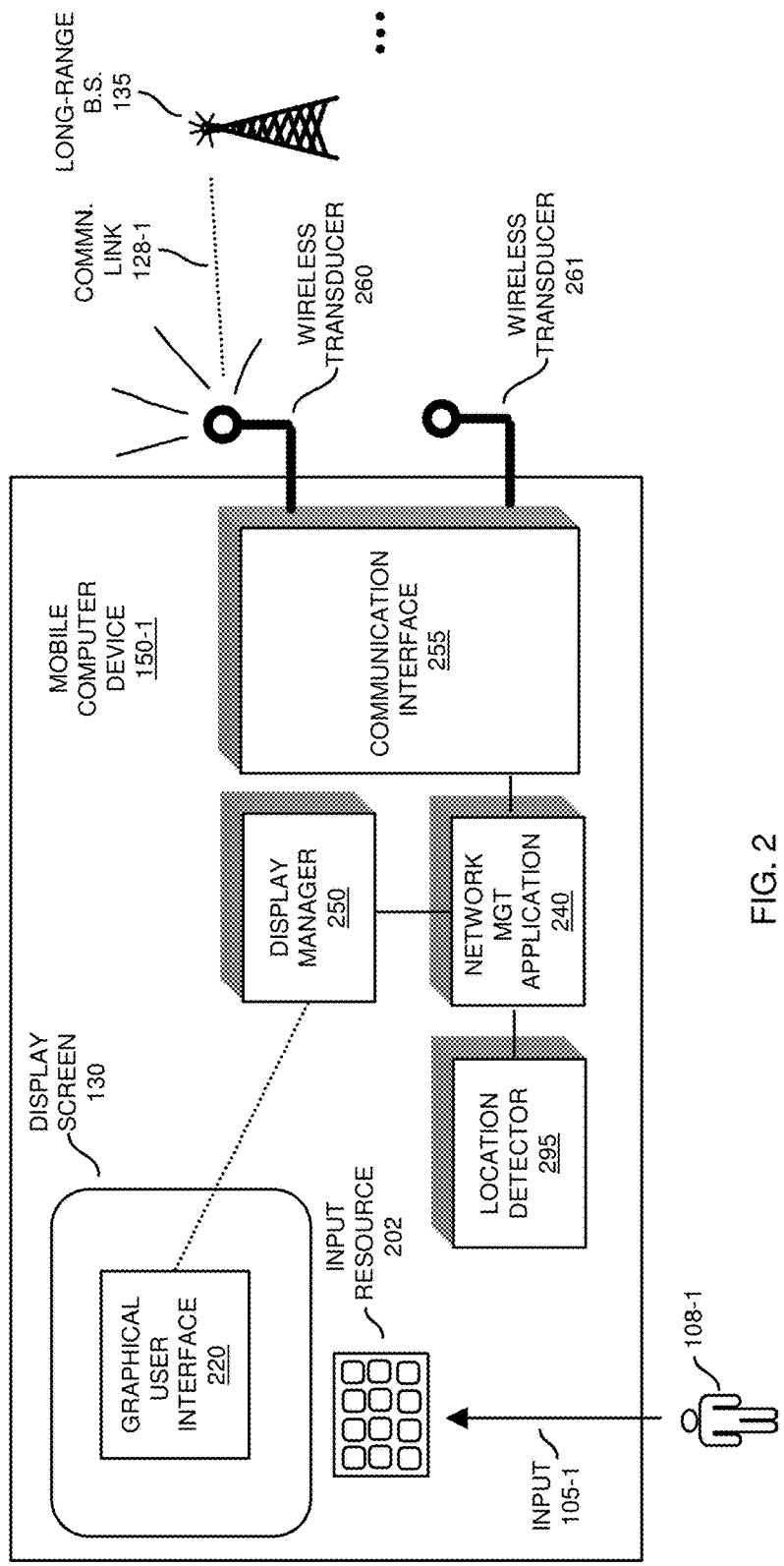
FIG. 2 is an example block diagram illustrating functionality associated with a mobile computer device according to embodiments herein.

FIG. 2 is an example block diagram illustrating functionality associated with a mobile computer device according to embodiments herein. Note that mobile computer device 150-1 can include hardware and software resources to carry out operations as discussed herein.

In one embodiment, as shown, the mobile computer device 150-1 can include wireless transducer 260. In this non-limiting example, wireless transducer 260 supports communications over communication link 128-1 to long-range base station 135 in accordance with cellular phone protocols supporting wireless mobile telecommunications technologies such as 2G, 3, 4G, etc.

As further shown, the mobile computer device 150-1 can include wireless transducer 261 supporting short-range wireless communications such as those based on a WiFi™ protocol (e.g., such as any WiFi™ standard or protocol as specified by IEEE 802.11).

In one embodiment, to communicate in accordance with WiFi™, mobile computer device 150-1 generates a discovery message from wireless transducer 261 to identify a presence of any WiFi™ base stations located in the vicinity of the mobile computer device 150-1. As described herein, if no WiFi™ base stations are available, the user 108-1 of the mobile computer device 150-1 can alternatively use wireless transducer 260 to communicate in network environment 100.

Note that in addition to including wireless transducer 260 and wireless transducer 261, the mobile computer device 150-1 can include a hardwired link (i.e., physical cable) facilitating communications between communication interface 255 and a corresponding base station.

Accordingly, mobile computer device 150-1 can communicate installation request messages 145 over any suitable communication link (e.g., a wireless link, hardwired link, etc.) to aggregator resource 140.

As previously discussed, network management application 240 enables corresponding user 108-1 to request installation of new wireless access points. Note that network management application 240 is shown as being executed locally on mobile computer device 150-1. However, in alternative embodiments, note that the network management application 240 can be located in any suitable one or more local or remote computer devices.

As a specific example of use, assume that the user 108-1 or other suitable resource provides appropriate input (e.g., commands, clicks, button presses, etc.) to input resource 202 (a keyboard, touch-screen interface, microphone, computer mouse, mouse pad, etc.). The input controls network management application 240.

Launching of network management application 240 can include execution of respective computer code associated with the network management application 240. Network management application 240 facilitates generation and transmission of installation request messages 145 in a manner as previously discussed. Via display manager 250, network management application 240 displays graphical user interface 220 on display screen 130 for viewing by user 108-1.

Via the graphical user interface 220, the user 108-1 is able to generate installation request messages as previously discussed. As its name suggests, location detector 295 can be used to detect a current location of the mobile computer device 150-1 in network environment 100. As discussed later in this specification, current location information generated by location detector 295 can be used by the network management application 240 to specify a location where user 108-1 would like installation of corresponding new wireless access point.

As briefly mentioned, mobile computer device 150-1 includes communication interface 255. Via communication interface 255, the network management application 240 is able to establish a respective wired or wireless communication link with a remote resource and initiate forwarding of installation request messages over network 190 to aggregator resource 140. As previously discussed, mobile computer device 150-1 can support both long-range and short-range wireless communications via wireless transducer 260 and/or wireless transducer 261.

By further way of non-limiting example, note again that if a WiFi™ access point is not currently available for use by a mobile computer device 150-1 to communicate the corresponding installation request message to aggregator resource 140 using wireless transducer 261, the network management application 240 can initiate forwarding of a corresponding installation request message over an RF (Radio Frequency) signal from wireless transducer 260 over communication link 128-1 to long-range base station 135.

Communication interface 255 facilitates conversion of digital information (such as network address information associated with aggregator resource 140, location information in which to install a corresponding wireless access point, subscriber information, etc.) associated with a respective installation request message generated by network management application 240 into the corresponding RF signal transmitted over communication link 128-1 to aggregator resource 140. Long-range base station 135 further transmits the installation request messages 145 over network 190 such as the Internet to aggregator resource 140 (such as a server resource).

If it is not possible for mobile computer device 150-1 to communicate over a wireless link to aggregator resource 140 using wireless transducer 260, wireless transducer 261, etc., because the mobile computer device 150-1 is outside wireless coverage, note that the mobile computer device 150-1 can be configured to temporarily store installation request messages 145. In such an instance, when the mobile computer device 150-1 detects that a corresponding wireless communication link or hardwired communication link is available to communicate a previously generated installation request messages, the mobile computer device 150-1 transmits the temporarily stored installation request messages to aggregator resource 140.

Figure 3:
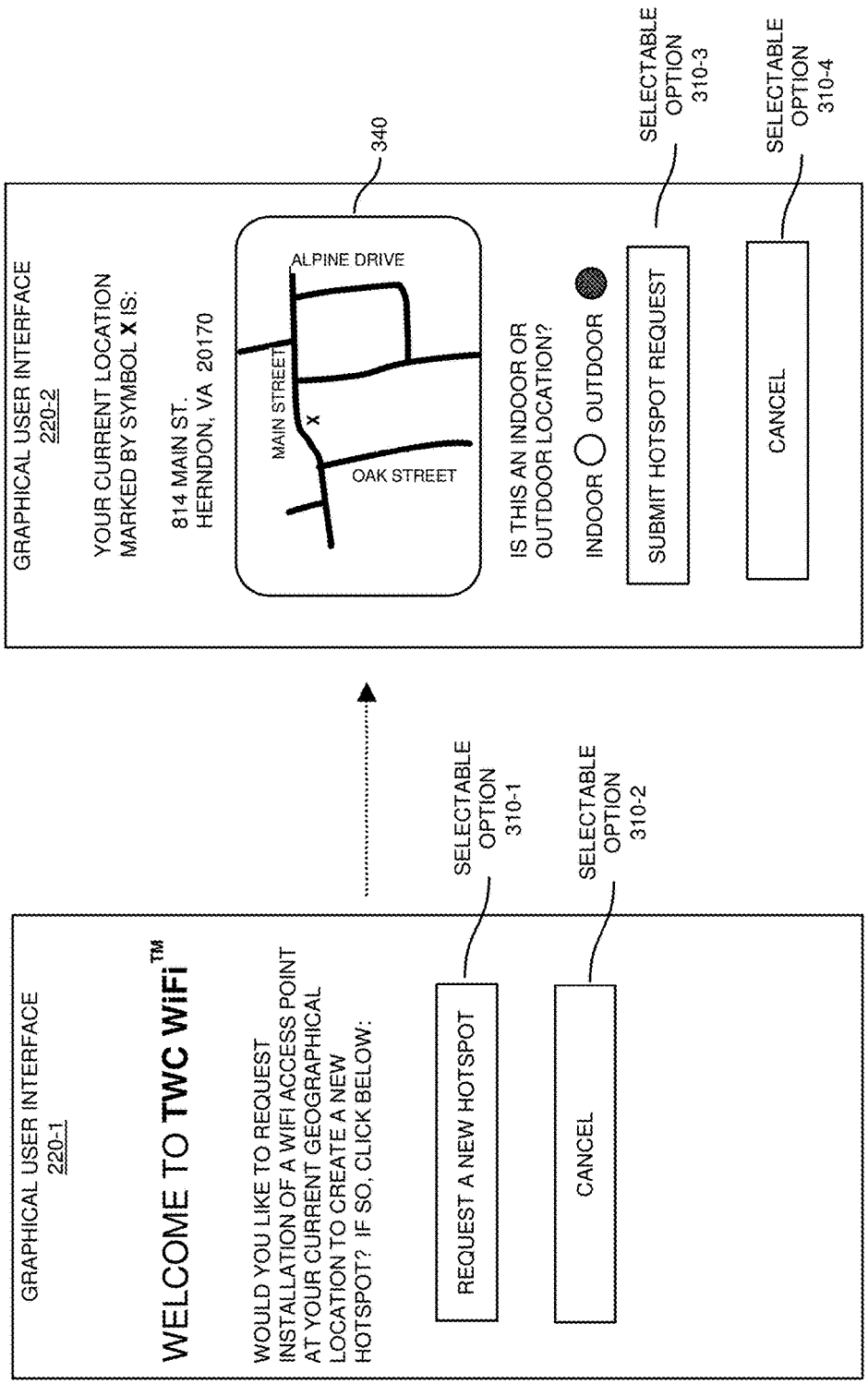
FIG. 3 is an example diagram illustrating use of a graphical user interface by a user to request installation of a new wireless access point at a current geographical location according to embodiments herein.

FIG. 3 is an example diagram illustrating use of a graphical user interface by a user to request installation of a new wireless access point at a current location according to embodiments herein.

More specifically, in response to executing network management application 240, display manager 250 initiates display of graphical user interface 220-1 on display screen 130 for viewing by a respective user 108-1. Graphical user interface 220-1 includes display of a notification that the user 108-1 is able to request installation of a new WiFi™ access point at a corresponding geographical location such as the current location of the mobile computer device 150-1. The notification and graphical user interface 220-1 indicates that a respective user is able to select the selectable option 310-1 to request installation of a new WiFi™ hotspot.

The mobile computer device 150-1 can be configured to execute network management application 240 and display graphical user interface 220 for any suitable reason.

In one embodiment, the network management application 240 initiates display of graphical user interface 220-1 and corresponding notification to the subscriber (user 108-1) operating the mobile computer device 150-1 in response to detecting establishment of wireless communication link 128-1 (such as a non-WiFi™ wireless communication link) by the computer device to communicate in the network environment 100.

The notification in graphical user interface 220-1 (such as WOULD YOU LIKE TO REQUEST INSTALLATION OF A WIFI™ ACCESS POINT AT YOUR CURRENT GEOGRAPHICAL LOCATION . . . ) prompts the subscriber user 108-1 to selectively input the request via selection of selectable option 310-1. Note that the user 108-1 can select selectable option 310-2 (CANCEL) to skip the process of requesting a new wireless access point.

Assume that the user 108-1 selects selectable option 310-1 in graphical user interface 220-1 to request installation of a new WiFi access point. Based on the selection, network management application 240 receives input from graphical user interface 220-1 that the user 108-1 would like to request the installation of a new wireless access point at a corresponding geographical location such as a user's current location. In response to the selection of selectable option 310-1, the network management application 240 initiates display of graphical user interface 220-2 on display screen 130.

As previously discussed, the location detector 295 can be configured to detect a current location of the mobile computer device 150-1. The location detector 295 communicates the location information to network management application 240. The network management application 240 generates graphical user interface 220-2 to indicate the current location of the mobile computer device 150-1 in the network environment 100. If desired, the network management application 240 can be configured to display map 340 to indicate locations of currently available WiFi™ hotspots and corresponding access points.

Assume in this example that the network management application 240 identifies the current location of the mobile computer device 150-1 to be 814 Main St., Herndon, Va. 20170. The network management application 240 retrieves a street map associated with this address. The street map can be obtained from any suitable resource.

By way of non-limiting example, to provide notification of a current location associated with mobile computer device and/or user 108-1, the network management application 240 executing on mobile computer device 150-1 initiates display of map 340 (such as a street map) on graphical user interface 220-2. Network management application 240 initiates display of a symbol X on the displayed map 340 of graphical user interface 220-2. The symbol X indicates the current location of the computer device 150-1 in the geographical region of network environment 100. Accordingly, via graphical user interface 220-2, the user 108-1 is able to identify their current location by viewing map 340 of graphical user interface 220-2.

As further shown, the graphical user interface 220-2 can be configured to notify the respective user 108-1 that the user may request installation of a new wireless access point at an indoor location or an outdoor location. In this example embodiment, as shown, assume that the user selects installation option at an outdoor location. User selection of the outdoor location is included in the corresponding installation request message 145-1 to notify aggregator resource 140 and service provider 195 of the type of requested wireless access point.

Note that as an alternative to selecting the outdoor option, the user 108-1 can select the indoor option to indicate to install a new wireless access point at an indoor location at the location specified. In this latter instance, the installation request message 145-1 would include information indicating that the user 108-1 would like to install the new wireless access point at an indoor location.

Subsequent to selection of whether the new access point is to be an indoor location or an outdoor location, the user 108-1 selects selectable option 310-3 to complete a process of generating a respective installation request message.

Assume that user 108-1 selects selectable option 310-3. In response to receiving a selection of selectable option 310-3, the network management application 240 completes generation and forwarding of a corresponding installation request message 145-1 to aggregator resource 170.

In one embodiment, the network management application 240 retrieves identity information associated with user 108-1 and/or mobile computer device 150-1 to include in the installation request message 145-1. For example, in one embodiment, the network management application 240 obtains a network address assigned to the mobile computer device 150-1. Management application 240 includes the network address of the mobile computer device 150-1 in the installation request message 145-1 to indicate an identity of the mobile computer device 150-1 or subscriber requesting the installation of the new wireless access point.

Note that as an alternative or in addition to including network address information in a corresponding installation request message 145-1, any suitable information associated with the user 108-1 can be included in the installation request message 145-1. For example, the user 108-1 can be assigned a unique subscriber identity value as provided by corresponding service provider 195. In such an instance, if desired, the network management application 240 can be configured to include the corresponding unique subscriber identity value in the installation request message 145-1.

Accordingly, downstream resources (such as the aggregator resource 140, service provider 195, etc., to which the installation request message is sent and subsequently analyzed) are able to identify which of multiple subscribers or mobile computer devices generated the corresponding installation request message 145-1.

Also, as previously discussed, the network management application 240 can be configured to include the current geographical location of the mobile computer device 150-1 in the installation request message 145-1.

Note that as an alternative to selecting selectable option 310-3, the corresponding user 108-1 can abort generation of a corresponding installation request message 145-1. For example, the user 108-1 can select selectable option 310-4 to abort creating and/or sending a corresponding installation request message 145-1 to aggregator resource 140.

In addition to facilitating installation of one or more new wireless access points in network environment 100, the network management application 240 can be configured to receive feedback from a respective user indicating whether or not the user thought the network management application 240 was a useful to in order to request installation of new wireless access points. The network management application 240 can be configured to forward the feedback to an appropriate resource that collects feedback from multiple users 108. Accordingly, via the collected feedback from multiple users 108, the service provider 195 is able to determine whether corresponding users 108 like the network management application 240.

Figure 4:
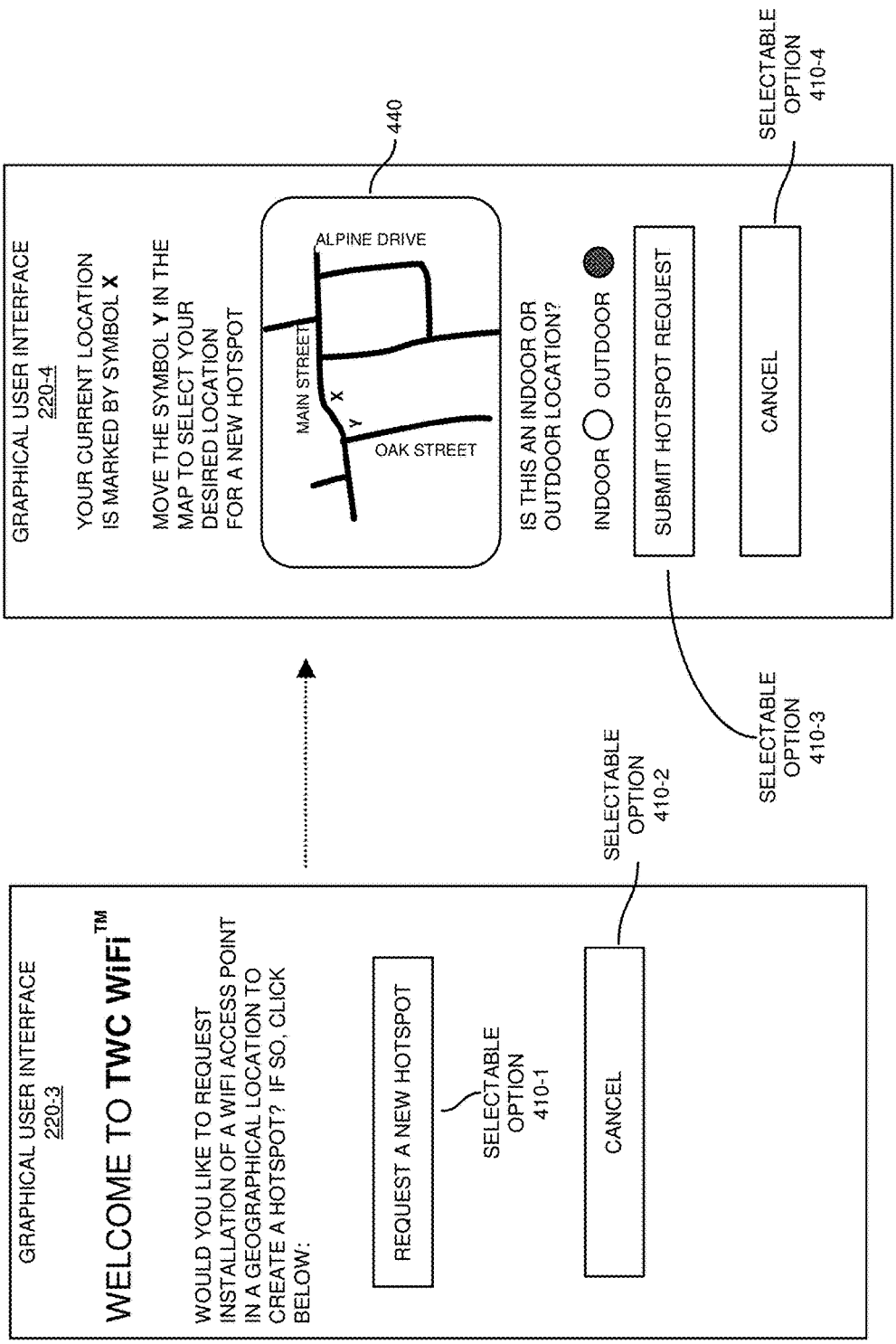
FIG. 4 is an example diagram illustrating use of a graphical user interface by a user to request installation of a new wireless access point at a user specified location according to embodiments herein.

FIG. 4 is an example diagram illustrating use of a graphical user interface by a user to request installation of a new wireless access point at a user specified location according to embodiments herein. In general, graphical user interfaces 220-3 in 220-4 enable a respective user 108-12 more particularly indicate the location in which to install a corresponding new wireless access point.

More specifically, in a similar manner as previously discussed above, network management application 240 initiates display of graphical user interface 220-3 enabling a corresponding user to request installation of a corresponding wireless access point at a specified location. To request installation a corresponding wireless access point in network environment 100, the user selects selectable option 410-1. Alternatively, if the user 108-1 does not wish to request installation of a new wireless access point, the user 108-1 selects selectable option 410-2.

Assume in this example that the user selects selectable option 410-1. In response to receiving selection of selectable option 410-1, the network management application 240 initiates display of graphical user interface 220-4 on display screen 130 for viewing by respective user 108-1. Via graphical user interface 220-4, the user is able to input specific information indicating the location in which to install a corresponding new wireless access point.

For example, as previously discussed, the location detector 295 can be configured to detect a current location of the mobile computer device 150-1 in network environment 100. Location detector 295 forwards corresponding location information indicating the current location to network management application 240. The network management application 240 initiates display of the symbol X on the map 440 to indicate the current location of the mobile computer device 150-1 in network environment 100.

The user 100-1 is able to select a corresponding location on the map 440 in which to install a corresponding new wireless access point. The graphical user interface 220-4 includes a notification indicating to the user 108-1 that the user 108-1 can move the symbol Y on the map 440 to select a desired location to install a new wireless access point (such as a WiFi™ access point).

Movements of symbol Y in graphical user interface 220-4 can be achieved in any suitable manner. For example, the user 108-1 can drag and drop symbol Y to any suitable location on map 440. Thus, the location of symbol Y can be a different location than the current location X of the mobile computer device 150-1.

Accordingly, from the subscriber, the network management application 240 receives selection of the geographical location (as specified by location marked by symbol Y) in which to install a corresponding new wireless access point via input to the displayed map 440. As mentioned, the network management application 240 initiates display of the symbol Y on displayed map 440 to indicate the geographical location selected by the subscriber for the installation of the new wireless access point.

To complete generation of installation request message 145-1, user 108-1 selects selectable option 410-3 displayed on graphical user interface 220-4. The generated installation request message 145-1 can include any information discussed herein.

As an alternative to selecting selectable option 410-3 to submit a corresponding wireless access point installation request message 145-1 to aggregator resource 140, the corresponding user 108-1 can abort generation of a corresponding installation request message 145-1. For example, the user 108-1 can select selectable option 410-4 to abort creating and/or sending a corresponding installation request message 145-1.

Figure 5:
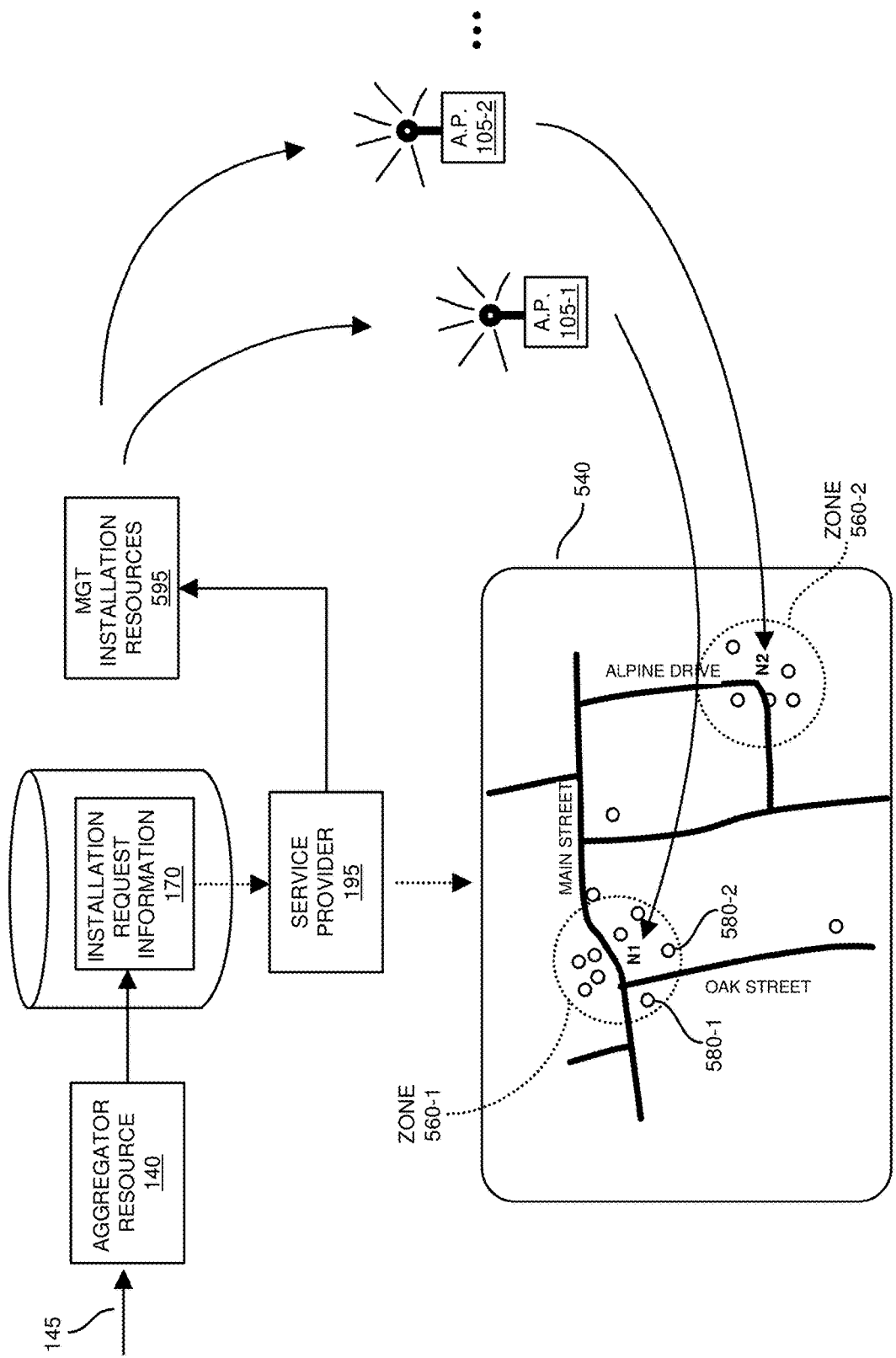
FIG. 5 is an example diagram illustrating generation of installation request information based on user feedback and installation of one or more new access points based on the feedback according to embodiments herein.

FIG. 5 is an example diagram illustrating generation of geographical information based on user feedback and installation of one or more new access points based on the feedback according to embodiments herein.

More specifically, the aggregator resource 140 receives installation request messages 145 (e.g., installation request message 145-1, installation request message 145-2, etc.) from multiple computer users in network environment 100. Each of the requests can be configured to specify a corresponding geographical location in which a respective computer user desires installation of a respective new wireless access point in the network environment 100.

Each of the installation request messages 145 received from users 108 can include a unique identifier value such as a network address of a corresponding computer device generating the respective request, a unique identifier value such as a name of the subscriber, etc.

As its name suggests, the aggregator resource 140 aggregates and subsequently processes the installation request messages 145 from the different users 108 to produce installation request information 170. The service provider 195 utilizes the installation request information 170 to identify suitable locations in which to install one or more new wireless access points in the geographical region.

In one embodiment, to facilitate installation of new wireless access points, the service provider 195 utilizes installation request information 170 to produce a map 540 illustrating a geographical region (in a vicinity of Main Street, Oak Street, as well as other streets) in the network environment 100. In this example embodiment, the map 540 includes symbols (e.g., circles) indicating locations in the geographical region in which corresponding users requested installation of corresponding new wireless access point.

Assume in this example embodiment that aggregator resource 140 receives a first installation request message 145-1 from user 108-1 operating mobile computer device 150-1. The installation request message 145-1 indicates that the user 108-1 would like installation of the new wireless access point at location 580-1 on map 540. Assume further in this example embodiment that the aggregator resource 140 receives the second installation request message 145-2 from user 108-2 operating mobile computer device 150-2. Installation request message 145-2 indicates that the user 108-2 would like installation of a new wireless access point at location 580-2 on map 540.

In this way, as specified by corresponding received installation request messages 145, the circles appearing on map 540 indicate locations where different users have requested installation of corresponding wireless access point and generally the same area.

In one embodiment, the map 540 is a heatmap.

Different colors, symbols, lines, etc., can be used in the map 540 to indicate different densities of installation requests per unit area. A first color can be used to indicate areas in map 540 in which relatively few users request the corresponding installation of a wireless access point; a second color can be used to indicate areas map 540 which the greater number of users requests installation of corresponding new wireless access point; and so on. Thus, certain colors can be used to indicate specific regions or zones in which a greater number of users requests installation of a corresponding new wireless access point.

The service provider 195 analyzes the map 540 to identify zones and determine which locations to install corresponding new wireless access points.

The service provider 195 can use any suitable criteria to determine where to install new wireless access points. For example, in one embodiment, the service provider 195 makes a determination where to install corresponding new wireless access points depending on how many subscribers per unit area request installation of corresponding wireless access point. More specifically, if the number of subscribers requesting a corresponding new wireless access point in a given unit of area (such as 40,000 square feet) or zone is above a threshold value, the service provider 195 can initiate installation of a corresponding wireless access point in the given area.

Note that use of the installation request information 170 to identify locations in which to install one or more new wireless access points in a geographical region can include identifying a specific region such as zone 560-1 in the network environment 100 in which a number of computer users 108 above a threshold value (such as 7 users) requests installation of a wireless access point in a specific region. Because 8 users (i.e., a value greater than the threshold value of 7) requests installation of a new wireless access point in a corresponding region near the corner of Oak Street and Main Street, the service provider 195 initiates installation of a new wireless access point at location marked by symbol N1 in zone 560-1 to provide wireless coverage in a vicinity of the specific region.

Similar to zone 560-1, zone 560-2 in map 540 indicates also an area in which many users have requested installation of corresponding new wireless access point.

Thus, use of installation request information 170 to identify locations in which to install new wireless access points in the geographical region can include: analyzing the installation request information 170 to identify zones 560 (such as zone hundred 60-1, zone 560-2, etc.) within the geographical region that include requests for installation of a new wireless access point above a threshold value; and providing notification of the zones 560 on map 540 for further analysis by the service provider 195.

Note that each of the subscribers in network environment 100 can be assigned to one of multiple different subscription levels. For example, a first group of users (subscribers) in network environment 100 can be assigned a first subscription level; a second group of users (subscribers) in network environment 100 can be assigned a second subscription level; a third group of users (subscribers) in network environment 100 can be assigned a third subscription level; and so on.

Each subscription level can provide a different level of access (e.g., amount of data, duration of time to retrieve content, bandwidth, etc.) to network 190.

Embodiments herein can further include reviewing subscription levels associated with the multiple computer users generating installation request messages 145 to determine whether to grant an installation request.

For example, the service provider 195 can be configured to initiate installation of new wireless access points at the locations in network environment 100 based at least in part on the subscription levels assigned to the different computer users. Users in the first group (first subscription level) can be assigned a first weight value; users in the second group (second subscription level) can be assigned a second weight value; users in the third group (third subscription level) can be assigned a third weight value; and so on.

If the total weight associated with multiple installation requests per unit area is greater than a predefined threshold value, the service provider 195 can initiate installation of corresponding wireless access point. More specifically, in one embodiment, the first weight assigned to users in the first group can be the value 1, the second weight assigned to users in the second group can be the value 0.5, the third weight assigned to users in the third group can be the value 0.2.

Assume that the service provider 195 requires greater than a threshold value of 4 to install a corresponding wireless access point in a zone. In such an instance, if five or more users assigned to the first subscription level request installation of corresponding access point in a zone, the service provider 195 initiates installation of the access point; if nine or more users assigned to the second subscription level request installation of corresponding access point in a zone, the service provider 195 initiates installation of the access point; if twenty one or more users assigned to the third subscription level request installation of corresponding access point in a zone, the service provider 195 initiates installation of the access point; if two user assigned the first subscription level and 5 users assigned to the second subscription level request installation of a corresponding access point zone, the service provider 195 initiates installation of the access point; and so on.

Assume further in this example that the service provider 195 makes a decision to install a new wireless access point at location marked by N1 and N2. Subsequent to analysis of map 540 and corresponding installation request information 170, the service provider 195 deploys management installation resources 595 (e.g., technicians, service trucks, etc.) to install access point 105-1 at location marked by N1 in zone 560-1; service provider 195 deploys management installation resources 595 to install access point 105-2 at location marked by N2 in zone 560-2; and so on.

Figure 6:
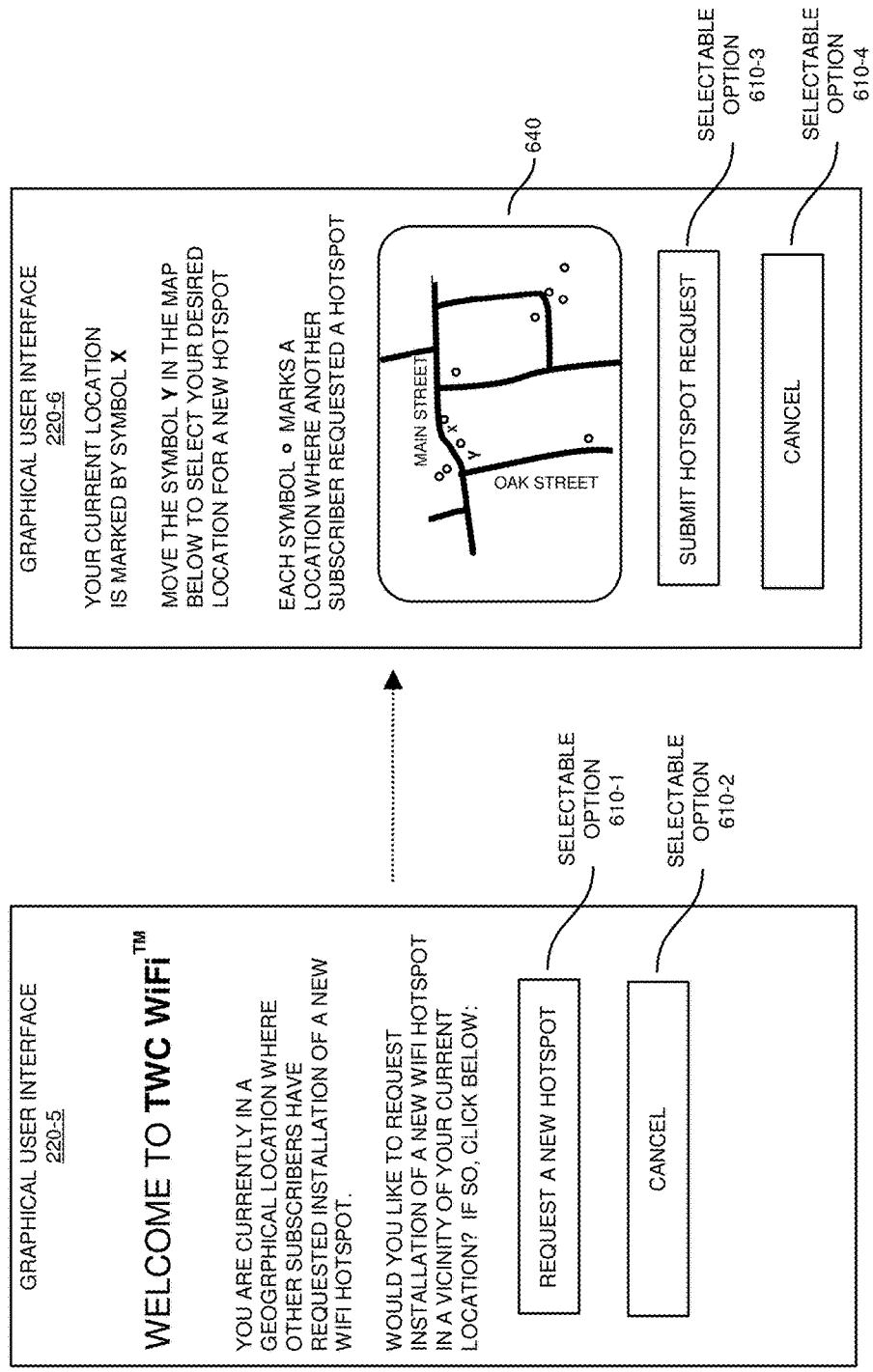
FIG. 6 is an example diagram illustrating use of a graphical user interface facilitating installation of new wireless access points according to embodiments herein.

FIG. 6 is an example diagram illustrating use of a graphical user interface enabling a respective user to display locations where other users request installation of wireless access points and specify a new location to install a respective access point according to embodiments herein.

As previously discussed, in response to detecting presence of the mobile computer device 150-1 in a particular geographical region of network environment 100, the network management application 240 can be configured to initiate display of a visual prompt on the display screen 130. The visual prompt (such as the text WOULD YOU LIKE TO REQUEST INSTALLATION OF A NEW WIFI™ HOTSPOT IN A VICINITY . . . ) provides notification that the subscriber operating the computer device can request installation of the new wireless access point.

In accordance with further embodiments, the network management application 240 can be configured to initiate display of a visual indication on a map to indicate locations in a geographical region where other subscribers or users of computer devices requested installation of one or more new wireless access points.

For example, the network management application 240 can be configured to monitor the current location of the mobile computer device 150-1 as it moves throughout network environment 100. In response to detecting: i) presence of the mobile computer device 150-1 in a vicinity of a geographical region in which other subscribers (users of mobile computer device 150) have requested installation of a respective new wireless access point, and ii) that a number of the other subscribers requesting the installation of the respective new wireless access point at the geographical location is above a threshold value, the network management application 240 initiates display of graphical user interface 220-5 to the subscriber (user 108-1) operating the mobile computer device 150-1.

As shown, network management application 240 can be configured to include selectable option 610-1 in graphical user interface 220-5 for the subscriber to request installation of a new wireless access point in the network environment 100. If the user 108-1 would like to generate a corresponding installation request message 145-1, the user 108-1 selects selectable option 610-1. Alternatively, the user 108-1 can select selectable option 610-2 to avoid generation of a corresponding installation request message 145.

Assume that the user 108-1 selects selectable option 610-1 in the user interface 220-5 to generate a corresponding installation request message. In such an instance, the network management application 240 initiates display of graphical user interface 220-6 on display screen 130 for viewing by a respective user 108-1.

As shown, the network management application 240 initiates display of map 640 and corresponding text message in graphical user interface 220-6. The corresponding text message indicates that the current location of the mobile computer device 150-1 is marked by symbol X in the map 640.

Further, the text in graphical user interface 220-6 indicates that each circle in map 640 represents a corresponding location where another subscriber requested installation of a corresponding wireless access point.

Accordingly, via the map 640 displayed in graphical user interface 220-6, the user 108-1 is able to view locations where other users have requested installation of a WiFi™ access point to create a corresponding WiFi™ hotspot.

By further way of non-limiting example, the network management application 240 can be configured to communicate with aggregator resource 140 (or some other suitable resource) to retrieve all or a portion of installation request information 170 to determine when the mobile computer device 150-1 is located in an area where other mobile computer devices have requested installation of new wireless access points.

As previously discussed, the installation requests information 170 indicates the locations where other users have requested installation of corresponding new wireless access points. In response to generating request for installation request information 170 (such as locations in a vicinity of the current location of the mobile computer device 150-1 where others have requested installation of a new wireless access point), the aggregator resource 140 forwards access request information to network management application 240 executing on mobile computer device 150-1.

In accordance with installation request information 170, the network management application 240 initiates display of circles on map 640 to indicate where other subscribers have requested installation of a corresponding wireless access point. Accordingly, the user 108-1 is able to identify and assess the locations in which others have requested installation of a corresponding new wireless access point.

In one embodiment, the network management application 240 analyzes the retrieved installation request information 170 to detect when the corresponding mobile computer device 150-1 is in a location in which other subscribers have requested installation of a corresponding new wireless access point. In response to detecting that the user 108-1 and mobile computer device 150-1 is currently located in an area in which multiple other users previously requested installation of a new wireless access point in the area, the network management application initiates display of graphical user interface 220-5 to notify the user 108-1 that they are currently in a geographically station where other subscribers have requested installation of a new WiFi™ hotspot.

Thus, embodiments herein can include soliciting the user 108-1 of mobile computer device 150-1 for feedback. This additional feedback can be used by the service provider 195 to help determine whether to go forward with installation of a corresponding new wireless access point in a vicinity at the corner of Main Street and Oak Street. In other words, the installation request information 170 produced by aggregate resource 140 may indicate that a specific location in network environment 100 appears to be a reasonably good candidate in which to install a corresponding new wireless access point. Soliciting additional feedback from subscribers that frequent that specific location can help to determine whether or not the service provider 195 should move forward with installation of a corresponding new wireless access point at the specific location.

Figure 7:
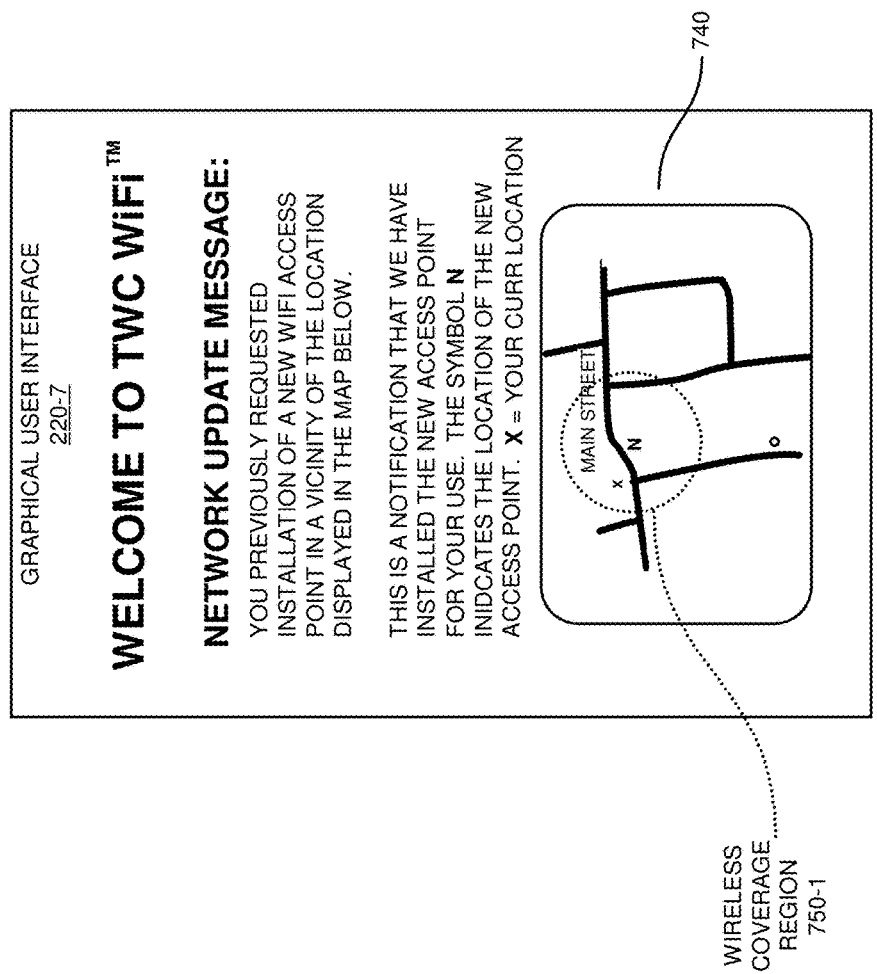
FIG. 7 is an example diagram illustrating notification that a newly installed access point is now available for use by a respective user according to embodiments herein.

FIG. 7 is an example diagram illustrating notification that a newly installed access point is available for use by a respective user according to embodiments herein.

In one embodiment, subsequent to installation of a new wireless access point based on user requests, the network management application 240 can be configured to generate and display graphical user interface 220-7 on display screen 130. As shown, the graphical user interface 220-7 provides notification to the subscriber (user 108-1) of the mobile computer device 150-1 that a new wireless access point has been installed at a particular location in network environment 100.

The notification in graphical user interface 220-7 can indicate presence of the newly installed wireless access point at the location as marked by the symbol N in map 740. In addition to displaying the location of a corresponding new wireless access point installed in the network environment 100, the network management application 240 can be configured to initiate display of corresponding information indicating an anticipated wireless coverage provided by the corresponding new access point. In this example embodiment, the network management application 240 initiates display of wireless coverage region 750-1 on display to map 240 to indicate geographical boundaries in which the corresponding user can reasonably expect to be able to communicate with the new wireless access point at the location is marked by symbol N.

In accordance with yet further example embodiments, note that the network management application 240 can be configured to receive updated location information indicating a current location of mobile computer device 150-1 as it moves through corresponding network environment 100.

The location information of current location of mobile computer device 150-1 can be received from location detector 295 or any other suitable resource. The network management application 240 compares the current location of the corresponding mobile computer device 150-1 to stored information indicating locations in which the corresponding user 108-1 requested installation of a corresponding new wireless access point.

In this example embodiment assume that the user 108-1 requested installation of the new wireless access point at or in a vicinity of the location marked by symbol N. In response to detecting that the current location of the mobile computer device 150-1 resides within the wireless coverage region 750-1 or that the mobile computer device 150-1 is in a vicinity of the location marked by symbol N, the network management application 240 initiates display of corresponding graphical user interface 220-7 on display screen 130 for viewing by a respective user 108-1. The notification in graphical user interface 220-7 indicates that the user 108-1 previously requested installation of a WiFi™ access point in a vicinity of the location marked by symbol N displayed in map 740.

Accordingly, embodiments herein can include providing the notification of a newly available wireless access point to the subscriber in response to detecting presence of the subscriber in a vicinity of the geographical location in which the subscriber previously requested installation of the new wireless access point.

In accordance with yet further embodiments, the network management application 240 can be configured to notify the user 108-1 that the new wireless access point is available in the particular area even though the user 108-1 did not previously request installation of the wireless access point. Thus, a given subscriber can be notified of the availability of a new wireless access point installation, which resulted from other subscribers requesting installation of the WiFi™ access point.

Figure 8:
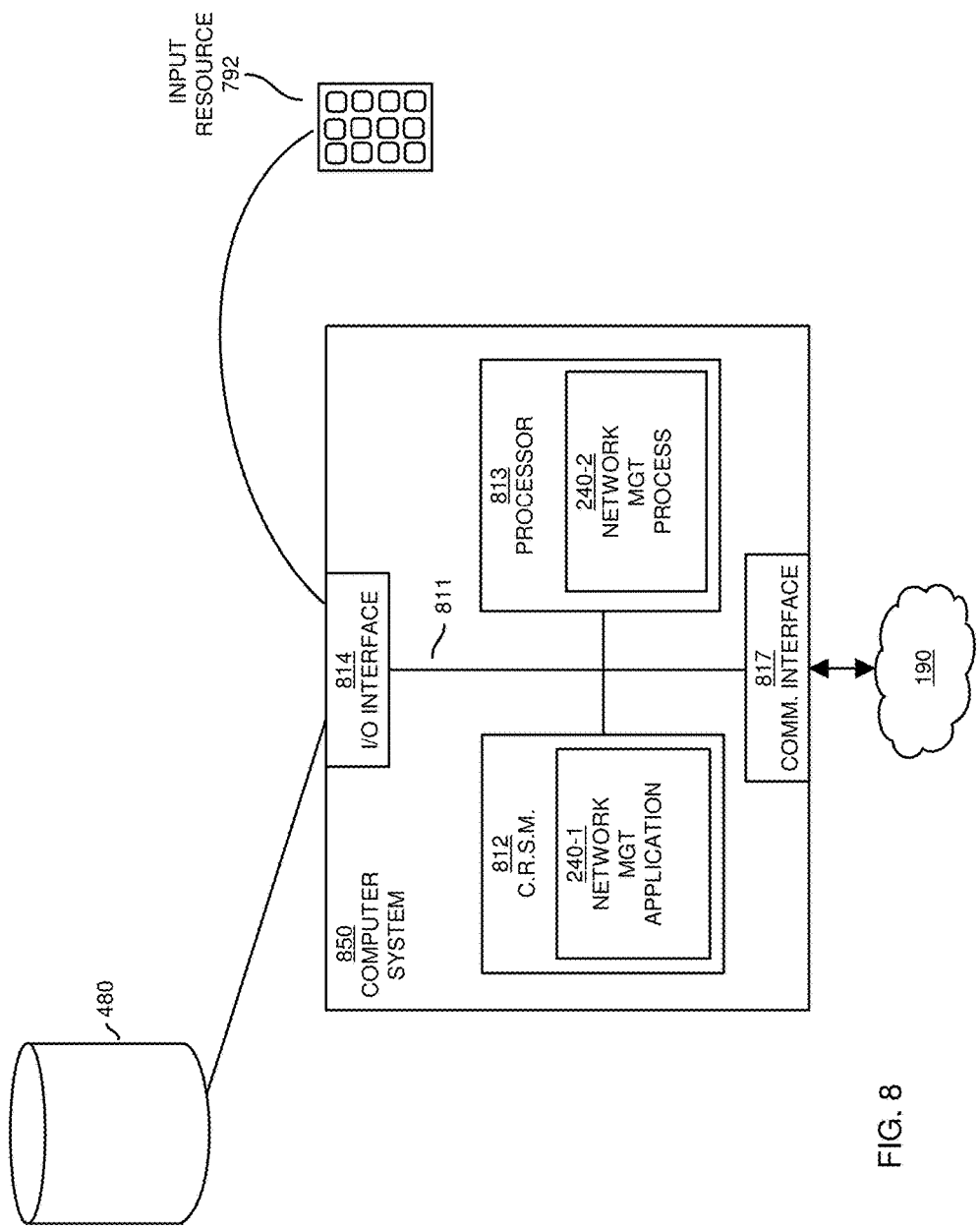
FIG. 8 is a diagram illustrating an example computer architecture in which to execute any of the functionality according to embodiments herein.

FIG. 8 is an example block diagram of a computer device for implementing any of the operations as discussed herein according to embodiments herein.

In one embodiment, network management application 240, aggregator resource 140, etc., are implemented by a computer such as computer system 850 to carry out one or more operations as discussed herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 480 and, if present, other devices such as a playback device, display screen, input resource 792, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information from repository 880.

As shown, computer readable storage media 812 is encoded with network management application 240-1 (e.g., software, firmware, etc.) executed by processor 813. Network management application 240-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in network management application 240-1 stored on computer readable storage medium 812.

Execution of the network management application 240-1 produces processing functionality such as network management process 240-2 in processor 813. In other words, the network management process 240-2 associated with processor 813 represents one or more aspects of executing network management application 240-1 within or upon the processor 813 in the computer system 850.

Those skilled in the art will understand that the computer system 850 can include other processes and/or software and hardware components, such as an operating system that controls allocation and use of hardware resources to execute management application 240-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
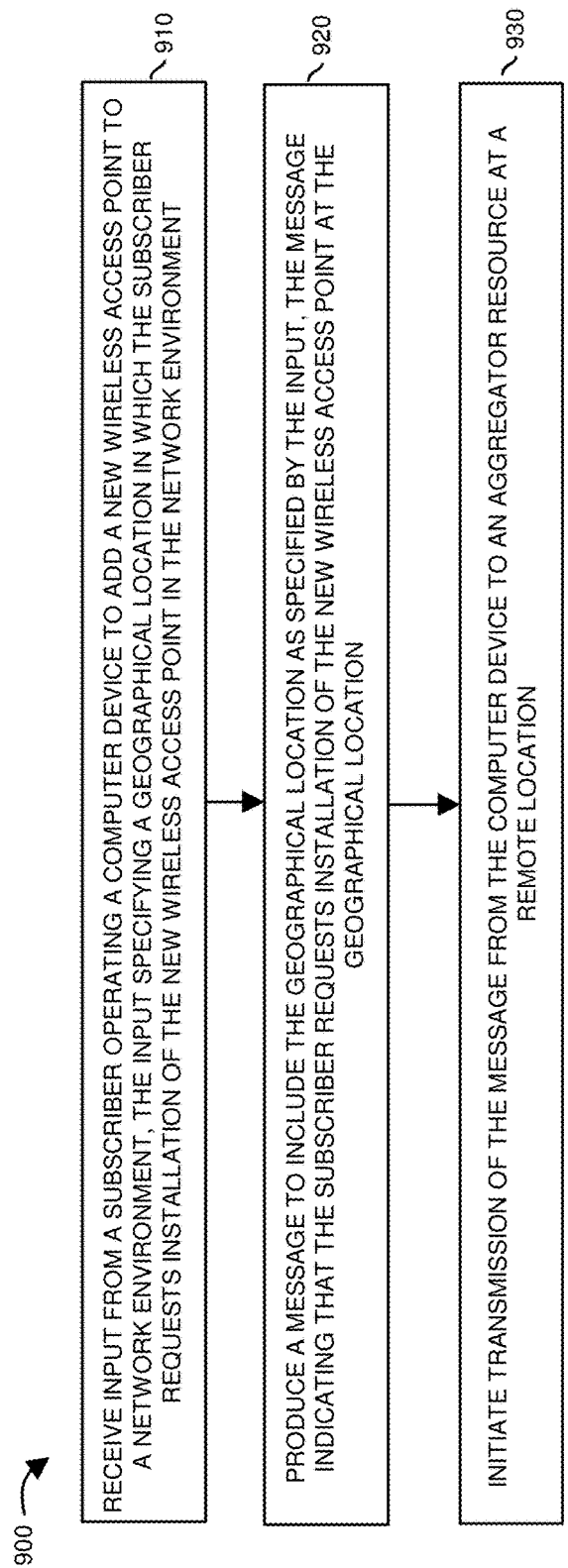
FIGS. 9 and 10 are example diagrams illustrating methods facilitating management and installation of one or more new access points in a network environment according to embodiments herein.

FIG. 9 is a flowchart 900 illustrating an example method according to embodiments. Note that there will be some overlap with respect to concepts as discussed above.

In processing block 910, the mobile computer device 150-1 receives input 105-1 from a subscriber (e.g., user 108-1) indicating to add a new wireless access point to network environment 100. The input 105-1 specifies a geographical location in which the subscriber requests installation of the new wireless access point in the network environment 100.

In processing block 920, the mobile computer device 150-1 produces a message (e.g., installation request message 145-1) to include the geographical location as specified by the input 105-1. The message indicates that the subscriber requests installation of the new wireless access point at the specified geographical location.

In processing block 930, the mobile computer device 150-1 initiates transmission of the message from the mobile computer device 150-1 to aggregator resource 140 at a remote location.

Figure 10:
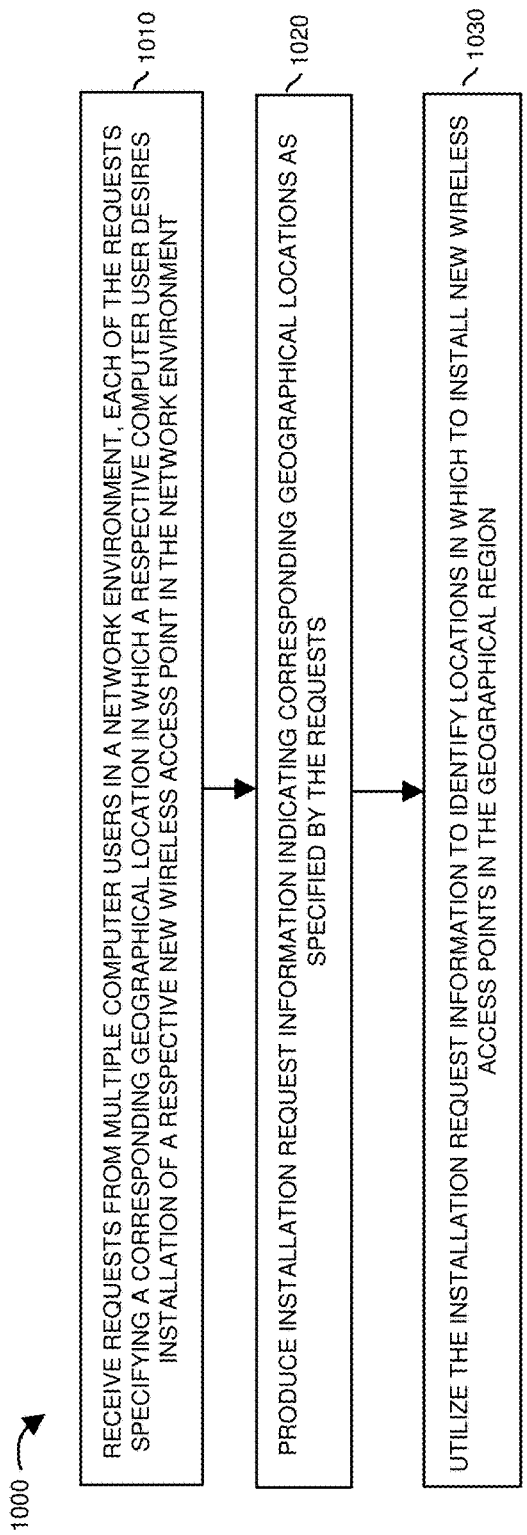

FIG. 10 is a flowchart 1000 illustrating an example method according to embodiments. Note that there will be some overlap with respect to concepts as discussed above.

In processing block 1010, the aggregator resource 140 receives requests (such as installation request messages 145) from multiple computer users in network environment 100. Each of the requests specifies a corresponding geographical location in which a respective computer user desires installation of a respective new wireless access point in the network environment 100.

In processing block 1020, the aggregator resource 140 produces installation request information 170 indicating corresponding geographical locations as specified by the requests.

In processing block 1030, the service provider 195 utilizes the installation request information 170 to identify locations in which to install new wireless access points in the geographical region.

Note again that techniques herein are well suited for use in installation of access points in wireless environments. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of determining where to install wireless access points in a network, the method comprising:
receiving, from a subscriber device, a request for an installation of a new wireless access point at a specified geographical location in the network, the request being one of multiple requests indicating to install the new wireless access point at the specified geographical location;
determining whether a number of the multiple requests to install the new wireless access point exceeds a predetermined threshold value;
in response to detecting that the number of multiple requests exceeds the predetermined threshold value, initiating the installation of the new wireless access point at the specified geographical location; and
the method further comprising: initiating the installation of the new wireless access point at the specified geographical location based at least in part in response to detecting presence of the subscriber device at the geographical location.

2. The method of claim 1 further comprising:
causing a selectable option to be displayed on the subscriber device, the selectable option for use in requesting the installation of the new wireless access point at the specified geographical location in the network.

3. The method as in claim 1 further comprising:
receiving the request to install the new wireless access point through an existing wireless access point disposed in a vicinity of the specified geographical location.

4. The method as in claim 1 further comprising:
subsequent to the installation of the new wireless access point at the specified geographical location, providing a notification to a user of the subscriber device, the notification indicating a presence and location of the new wireless access point.

5. The method as in claim 4 further comprising:
providing the notification to the subscriber device in response to detecting presence of the subscriber device at the specified geographical location.

6. The method as in claim 1, wherein the request received from the subscriber device indicates the specified geographical location.

7. The method as in claim 6 further comprising:
subsequent to the installation of the new wireless access point at the specified geographical location, providing a notification to a user of the subscriber device that the new wireless access point has been installed at the specified geographical location.

8. The method as in claim 1, wherein each of the multiple requests is received from a different subscriber device operated at the specified geographical location.

9. The method as in claim 1 further comprising:
prior to receiving the request, providing notification to a user operating the subscriber device, the notification displaying a map specifying a current location of the user; and wherein the request indicates to install the new wireless access point at the current location, the current location being the specified geographical location in the network.

10. The method as in claim 1 further comprising:
prior to receiving the request, providing notification to a user of the subscriber device, the notification including a map specifying a current location of the user; and
wherein the request indicates to install the new wireless access point at the specified geographical location in the network, the specified geographical location being different than the current location of the user.

11. The method as in claim 10, wherein the user of the subscriber device indicates the specified geographical location via input to the map.

12. The method as in claim 1 further comprising:
prior to receiving the request, providing notification to a user of the subscriber device, the notification including a map specifying a current location of the user; and
wherein the request indicates to install the new wireless access point at the specified geographical location in the network, the specified geographical location being the current location of the user as specified by the map.

13. A computer system comprising:
computer processor hardware; and
a hardware storage resource coupled to the computer processor hardware, the hardware storage resource storing instructions that, when executed by the computer processor hardware, cause the computer processor hardware to:
receive, from a subscriber device, a request for an installation of a new wireless access point at a specified geographical location in a network, the request being one of multiple requests indicating to install the new wireless access point at the specified geographical location;
determine whether a number of the multiple requests to install the new wireless access point exceeds a predetermined threshold value;
in response to detecting that the number of multiple requests exceeds the predetermined threshold value, initiate the installation of the new wireless access point at the specified geographical location; and
initiate the installation of the new wireless access point at the specified geographical location based at least in part in response to detecting presence of the subscriber device at the geographical location.

14. A method of determining where to install wireless access points in a network, the method comprising:
receiving, from a subscriber device, a request for an installation of a new wireless access point at a specified geographical location in the network, the request being one of multiple requests indicating to install the new wireless access point at the specified geographical location;
determining whether a number of the multiple requests to install the new wireless access point exceeds a predetermined threshold value;
in response to detecting that the number of multiple requests exceeds the predetermined threshold value, initiating the installation of the new wireless access point at the specified geographical location;
prior to receiving the request, providing notification to a user of the subscriber device, the notification including a map specifying a current location of the user;
wherein the request indicates to install the new wireless access point at the specified geographical location in the network, the specified geographical location being different than the current location of the user;
wherein the user of the subscriber device indicates the specified geographical location via input to the map; and
wherein the map displayed on the subscriber device indicates multiple locations where other users requested installation of a new wireless access point in the network.

* * * * *